US009726161B2

(12) United States Patent
Kim et al.

(10) Patent No.: US 9,726,161 B2
(45) Date of Patent: Aug. 8, 2017

(54) MICROPUMP

(75) Inventors: Won Kyoung Kim, Pohang-si (KR);
Jae Chun Ryu, Daejeon-si (KR);
Kwan Hyoung Kang, Pohang-si (KR);
Kyoung-Ah Min, legal representative, Seoul (KR)

(73) Assignee: POSTECH ACADEMY-INDUSTRY FOUNDATION, Pohang-si, Gyeongsangbuk-Do (KR)

( * ) Notice: Subject to any disclaimer, the term of this patent is extended or adjusted under 35 U.S.C. 154(b) by 705 days.

(21) Appl. No.: 14/110,309

(22) PCT Filed: Nov. 29, 2011

(86) PCT No.: PCT/KR2011/009165
§ 371 (c)(1),
(2), (4) Date: Feb. 3, 2014

(87) PCT Pub. No.: WO2012/138035
PCT Pub. Date: Oct. 11, 2012

(65) Prior Publication Data
US 2014/0219823 A1 Aug. 7, 2014

(30) Foreign Application Priority Data
Apr. 6, 2011 (KR) ........................ 10-2011-0031646

(51) Int. Cl.
*F04B 19/00* (2006.01)
*F04B 43/04* (2006.01)
*H02K 44/06* (2006.01)

(52) U.S. Cl.
CPC .......... *F04B 19/006* (2013.01); *F04B 43/043* (2013.01); *H02K 44/06* (2013.01)

(58) Field of Classification Search
CPC ...... F04B 19/006; F04B 43/043; H02K 44/06
(Continued)

(56) References Cited

U.S. PATENT DOCUMENTS 4,380,720 A * 4/1983 Fleck ........................ B03C 3/12
250/281
5,907,469 A * 5/1999 Kim ........................ B05B 5/032
361/225
(Continued)

FOREIGN PATENT DOCUMENTS

EP 1 911 971 4/2008
JP 10-146075 5/1998
(Continued)

OTHER PUBLICATIONS

International Search Report for International Application No. PCT/KR2011/009165, dated May 25, 2012.

*Primary Examiner* — Dominick L Plakkoottam
*Assistant Examiner* — Connor Tremarche
(74) *Attorney, Agent, or Firm* — Kile Park Reed & Houtteman PLLC (57) ABSTRACT

A micropump configured to control flow of an insulation fluid includes: a rectangular channel 370 configured to have a rectangular shape in which a movement passage of the insulation fluid; a planar electrode forming section 310 configured to be formed inside the rectangular channel and have a planar shape for applying an electric field; an inflow section 320 configured such that the insulation fluid flows in; and an outflow section 330 configured such that the insulation fluid flows out. Since an insulation fluid with low conductivity in a range of $10^{-10}$ to $10^{-12}$ S/m is transported with a simple technical structure without using a complicated component, it is possible to obtain the advantage of cost saving and application to various minute dynamics devices.

9 Claims, 12 Drawing Sheets (58) Field of Classification Search
USPC .......................................................... 417/48
See application file for complete search history.

(56) References Cited

U.S. PATENT DOCUMENTS

| | | | | |
|---|---|---|---|---|
| 6,312,623 | B1* | 11/2001 | Oommen | H01B 3/20 174/17 LF |
| 7,708,872 | B2* | 5/2010 | Eidsnes | A41D 31/0016 204/450 |
| 8,348,626 | B2* | 1/2013 | Roy | F04B 19/006 417/48 |
| 2007/0046219 | A1* | 3/2007 | Krichtafovitch | B03C 3/017 315/506 |
| 2007/0140931 | A1* | 6/2007 | Huang | F24F 1/0059 422/186.04 |
| 2007/0240989 | A1* | 10/2007 | Levitan | B01F 13/0076 204/451 |
| 2007/0295605 | A1* | 12/2007 | Park | F04B 19/006 204/601 |
| 2008/0131293 | A1 | 6/2008 | Hanaoka et al. | |
| 2008/0227665 | A1* | 9/2008 | Ezell | C09K 8/44 507/121 |
| 2011/0037325 | A1* | 2/2011 | Ciocanel | F04F 99/00 310/11 |

FOREIGN PATENT DOCUMENTS

| | | |
|---|---|---|
| JP | 11-125173 | 5/1999 |
| JP | 11-215869 | 8/1999 |
| JP | 2003-284316 | 10/2003 |
| JP | 2005-514196 | 5/2005 |
| JP | 2005-269809 | 9/2005 |
| JP | 2005-353887 | 12/2005 |
| JP | 2006-42430 | 2/2006 |
| JP | 2007-196316 | 8/2007 |
| JP | 2008-295114 | 12/2008 |
| JP | 2010-63342 | 3/2010 |
| JP | 2010-90787 | 4/2010 |
| JP | 2010-273526 | 12/2010 |
| KR | 10-0800171 | 1/2008 |
| KR | 10-2008-0070358 | 7/2008 |
| KR | 10-2010-0060723 | 6/2010 |
| WO | 2004/058333 | 7/2004 |

* cited by examiner

MICROPUMP

BACKGROUND OF THE INVENTION

Field of the Invention

The present invention relates to a micropump, and more particularly, to a micropump configured to include a planar electrode or a cylinder electrode installed so that a direct-current or alternating-current electric field is applied to a rectangular channel or a cylinder channel and to be capable of transporting an insulation fluid with low conductivity in the range of $10^{-10}$ to $10^{-12}$ S/m.

Description of the Related Art

In recent years, interest and development of microfluidic systems have increased internationally. Such microfluidic systems are systems using micro-electromechanical systems (MEMS) technologies and are very important systems applied to fields such as clinical diagnoses, bio-medicine studies such as DNA and peptide, chemical analyses for new medicine development, ink jet printing, small cooling systems, small fuel cell fields.

Micropump and microvalves are core components configured to enable a fluid to flow in such a microfluidic system and have fluid control functions of adjusting an amount of fluid and a rate of the fluid and blocking the flow.

Here, micropumps are devices, such as small mechanical devices, minute fluid dynamics devices, microrobots, and electromechanical devices, configured to transport a fluid in a variety of fields and are evaluated as very important technologies in the near future.

In the related art, since pump devices configured to realize mechanical pressure transduction mainly used to transmit a fluid have very large sizes, there are technical limitations in manufacturing the pump devices with very small sizes. Therefore, there is a problem that it is difficult to apply the pump devices to micropumps required to have very small sizes.

In order to overcome the foregoing problems, in the related art, technologies for transporting a fluid by electro-hydraulic flow occurring at the time of application of an electric field to the fluid to transport the fluid with a simple structure without using many components have been used to manufacture micropumps.

As representative examples, there are an ion-drag pump and an electro-sensitive fluid micropump usable for an insulation fluid.

However, the ion-drag pump and the electro-sensitive fluid micropump of the related art have the following technical problems.

First, the technologies of the related art have the problems that a target fluid usable in a pump is specified and it is difficult to apply the technologies to a general-purpose insulation fluid with electric conductivity in the range of $10^{-10}$ to $10^{-12}$ S/m.

Second, in the technologies of the related art, a micropump is operated only by a direct-current (DC) electric field and a flow rate of an insulation fluid is adjusted only by a voltage.

SUMMARY OF THE INVENTION

Accordingly, the present invention has been made in an effort to solve the problems occurring in the related art, and an object of the present invention is to provide a micropump capable of transporting an insulation fluid with low conductivity in the range of $10^{-10}$ to $10^{-12}$ S/m.

In order to achieve the above object, according to one aspect of the present invention, there is provided a micropump configured to control flow of an insulation fluid include: a rectangular channel (370) configured to have a rectangular shape in which a movement passage of the insulation fluid; a planar electrode forming section (310) configured to be formed inside the rectangular channel and have a planar shape for applying an electric field; an inflow section (320) configured such that the insulation fluid flows in; and an outflow section (330) configured such that the insulation fluid flows out.

Since an insulation fluid with low conductivity in the range of $10^{-10}$ to $10^{-12}$ S/m is transported merely with a simple technical structure without using a complicated component, it is possible to obtain the advantage of cost saving and application to various minute dynamics devices.

BRIEF DESCRIPTION OF THE DRAWINGS

The above objects, and other features and advantages of the present invention will become more apparent after a reading of the following detailed description taken in conjunction with the drawings, in which.

DETAILED DESCRIPTION OF PREFERRED EMBODIMENTS

Reference will now be made in greater detail to a preferred embodiment of the invention, an example of which is illustrated in the accompanying drawings. Wherever possible, the same reference numerals will be used throughout the drawings and the description to refer to the same or like parts.

Hereinafter, specific embodiments of the present invention will be described in detail with reference to the drawings.

Figure 1:
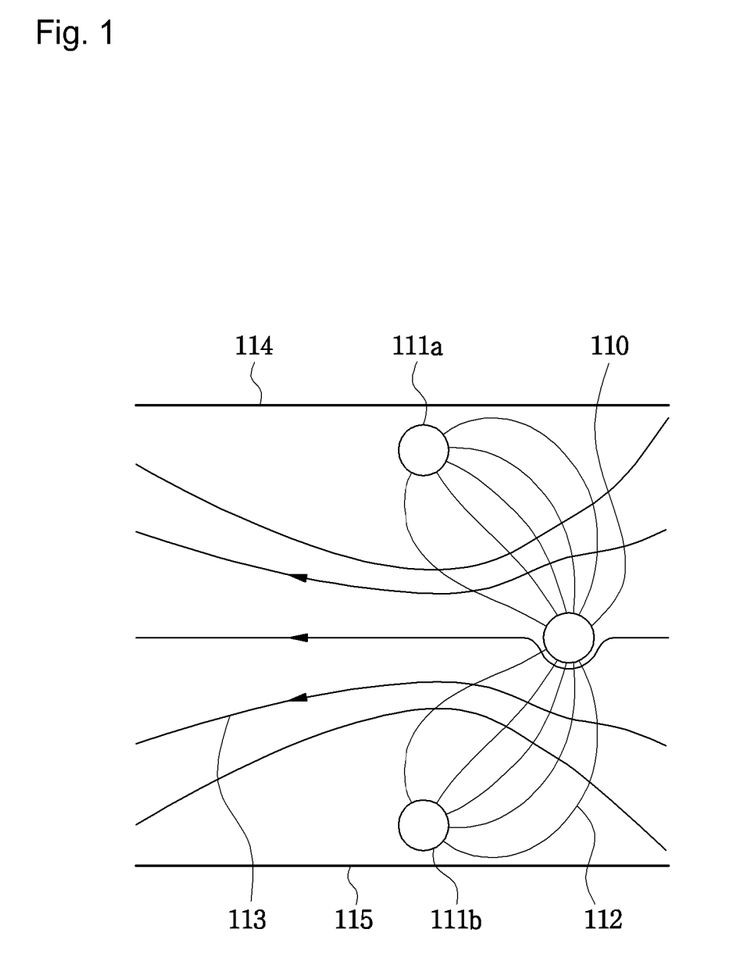
FIG. 1 is a diagram for describing a first principle of a cylinder electrode type insulation fluid micropump according to a first embodiment of the present invention.

FIG. 1 is a diagram for describing a first principle of a cylinder electrode type insulation fluid micropump according to a first embodiment of the present invention.

Referring to FIG. 1, the cylinder electrode type insulation fluid micropump include a first cylinder electrode 110, a second cylinder electrode 111a, and a third cylinder electrode 111b installed to form a triangle shape in a vertical direction perpendicular to rectangular channels 114 and 115.

The first cylinder electrode 110 includes a (−) pole or a (+) pole. A direct-current (DC) or alternating-current (AC) voltage is applied to the first cylinder electrode 110. A ground (GND) voltage is applied to the second cylinder electrode 111a and the third cylinder electrode 111b.

Hereinafter, an operation principle of the cylinder electrode type insulation fluid micropump according to the present invention will be described in brief.

When the insides of the rectangular channels 114 and 115 are filled with an insulation fluid and a direct-current (DC) or alternating-current (AC) voltage is subsequently applied to the first cylinder electrode 110, irregular electrode fields 112 are formed between the first cylinder electrode 110 and the second cylinder electrode 111a and between the first cylinder electrode 110 and the third cylinder electrode 111b.

In the formed irregular electric fields 112, a gradient of electric conductivity of the insulation fluid is formed due to the Onsager effect. The formed gradient of the electric conductivity forms free charges in the insulation fluid due to the Maxwell-Wagner polarization phenomenon.

The formed free charges transfer a momentum to the peripheral insulation fluid while moving due to the influence of an electric force, so that the insulation fluid moves in one direction along an illustrated path 113. Thus, the cylinder electrode type insulation fluid micropump according to the present invention functions as a pump.

As the insulation fluid according to the present invention, a solution is used in which an ionic or non-ionic surfactant or an alcoholic additive is a little added to an organic or inorganic insulation fluid with very low electric conductivity in the range of $10^{-10}$ to $10^{-12}$ S/m. Preferably, an additive of 0.001 wt % to 10 wt % is contained. In an example of the present invention, a silicon oil, dodecane, or toluene is used as the insulation fluid. Sorbitane trioleate (Span 85) may be used as the ionic surfactant. Sodium di-2-ethylhexyl sulfosuccinate (AOT) may be used as the non-ionic surfactant. Tetrabutylammonium tetrabutylborate may be used an oil soluble salt and methanol may be used as the alcohol.

In the present invention, metal substances with a property which is not solved in the insulation fluid are used for all of the first cylinder electrode 110, the second cylinder electrode 111a, and the third cylinder electrode 111b. An insulation substance such as glass, plastic, or rubber is used for the rectangular channels 114 and 115. For example, iron, copper, tungsten, aluminum, gold, silver, or the like is used as the metal substance.

Figure 2:
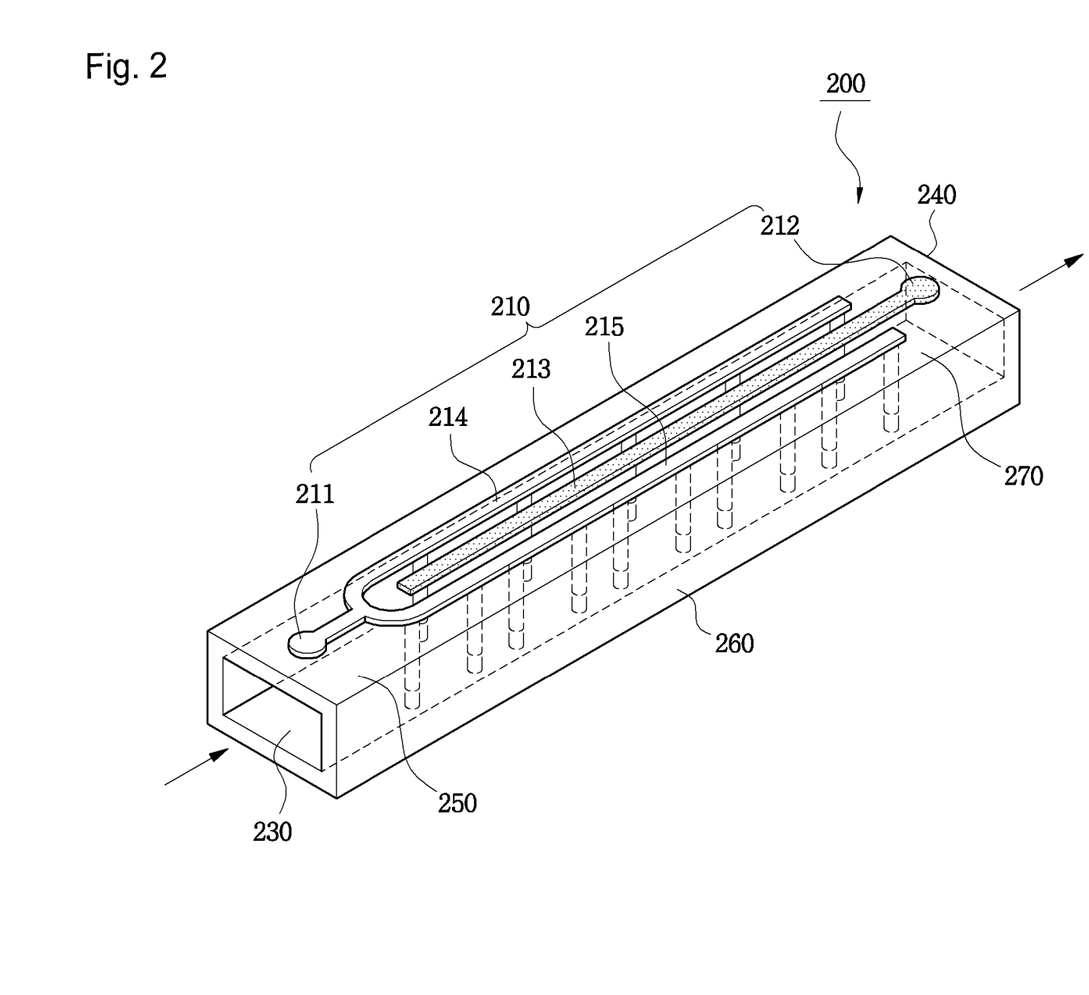
FIG. 2 is a perspective view illustrating a cylinder electrode-rectangular channel type micropump according to the first embodiment of the preset invention.
Figure 3:
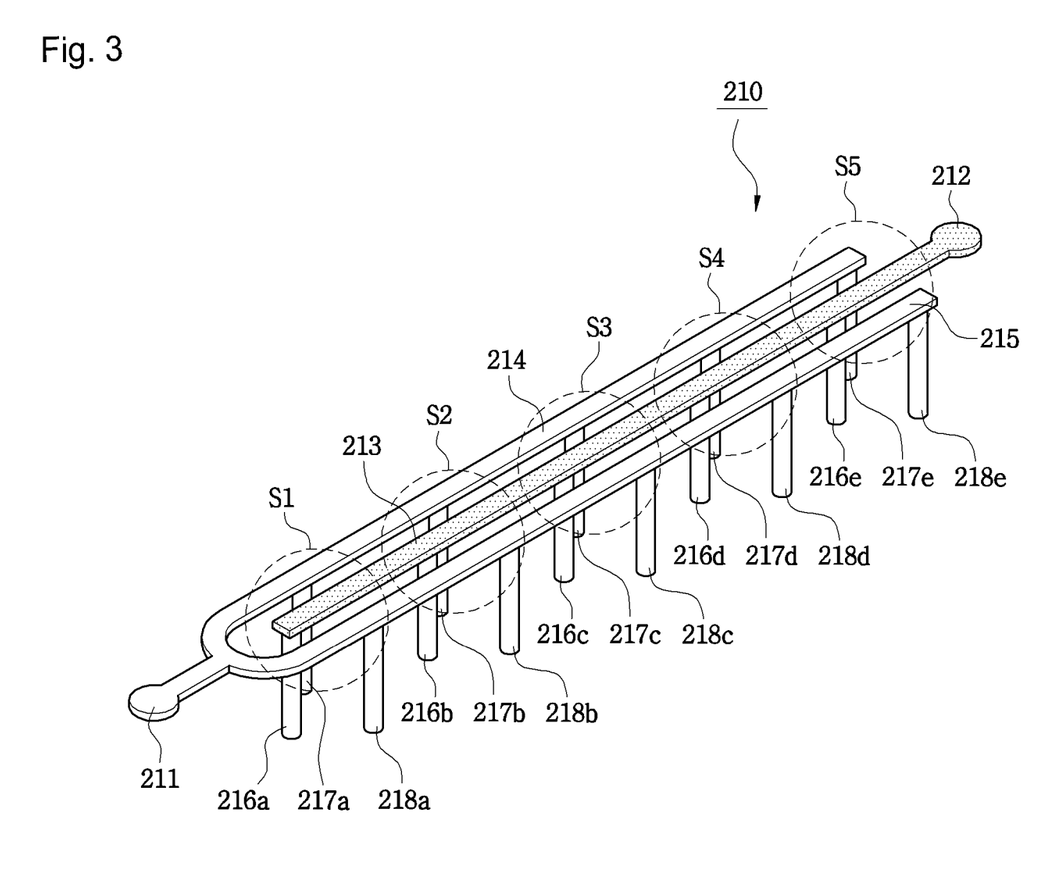
FIG. 3 is a diagram illustrating an inner electrode arrangement of the cylinder electrode-rectangular channel type micropump according to the first embodiment of the present invention.

FIGS. 2 and 3 are a perspective view illustrating a cylinder electrode-rectangular channel type micropump according to the first embodiment of the preset invention and a diagram illustrating an inner electrode arrangement of the cylinder electrode-rectangular channel type micropump, respectively.

Referring to FIG. 2, a cylinder electrode-rectangular channel type micropump 200 according to the present invention includes a channel upper plate 270, a rectangular channel 250 including the channel upper plate and having a rectangular parallelepiped shape, an electrode forming section 210, an inflow section 230, and an outflow section 240.

The electrode forming section 210 is configured to include a ground electrode connecting portion 211, an external power supply connecting portion 212, a first cylinder electrode upper joining portion 213, a second cylinder electrode upper joining portion 214, and a third cylinder electrode upper joining portion 215.

The ground electrode connecting portion 211 has a structure in which the second cylinder electrode upper joining portion 214 and the third cylinder electrode upper joining portion 215 are connected to each other and the ground voltage (GND) may be applied thereto.

The external power supply connecting portion 212 has a structure which is connected to the first cylinder electrode upper joining portion 213 and a direct current (DC) or alternating current (AC) voltage supplied from an external power supply may be applied to first cylinder electrodes 216 connected to the first cylinder electrode upper joining portion 213. Here, the direct current is preferably in the range of 10 V to 10,000 V and the alternating current is preferably in the range of 10 $V_{rms}$ to 10,000 $V_{rms}$ at 0.1 kHz to 10 kHz.

The first cylinder electrode upper joining portion 213 has a structure in which a plurality of first cylinder electrodes 216a to 216e having a cylinder shape are connected. Here, the cylinder electrodes 216a to 216e are distant at constant intervals and are preferably distant by 5 to 10 times a cylinder diameter. Likewise, the second cylinder electrode upper joining portion 214 and the third cylinder electrode upper joining portion 215 have structures in which a plurality of second cylinder electrodes 217a to 217e and a plurality of third cylinder electrodes 218a to 218e having a cylinder shape are connected at constant intervals, respectively.

The first cylinder electrode 216a, the second cylinder electrode 217a, and third cylinder electrode 218a located at the first position are formed as one set to constitute a first electrode set S1 with a triangle shape.

Likewise, the first cylinder electrode 216b, the second cylinder electrode 217b, and the third cylinder electrode 218b located at the second position to the first cylinder electrode 216e, the second cylinder electrode 217e, and the third cylinder electrode 218e located at the fifth position constitute a second electrode set S2 to a fifth electrode set S5, respectively.

The plurality of electrode sets S1 may be formed at constant intervals. As the number of electrode sets S1 increases, a flow rate of the insulation fluid is higher. Therefore, the intensity of the pump increases.

In the case of the present invention, the flow rate of the insulation fluid may be adjusted not only by adjusting a voltage in a direct-current electric field but also by adjusting a voltage and an alternating-current frequency in a case of an alternating-current electric field.

In the case of the present invention, the five electrode sets S1 to S5 have been described, but the present invention is not limited thereto. Of course, various modifications may be made in consideration of the fact that the movement rate of the insulation substance is faster as the number of electrode sets increases.

Figure 4:
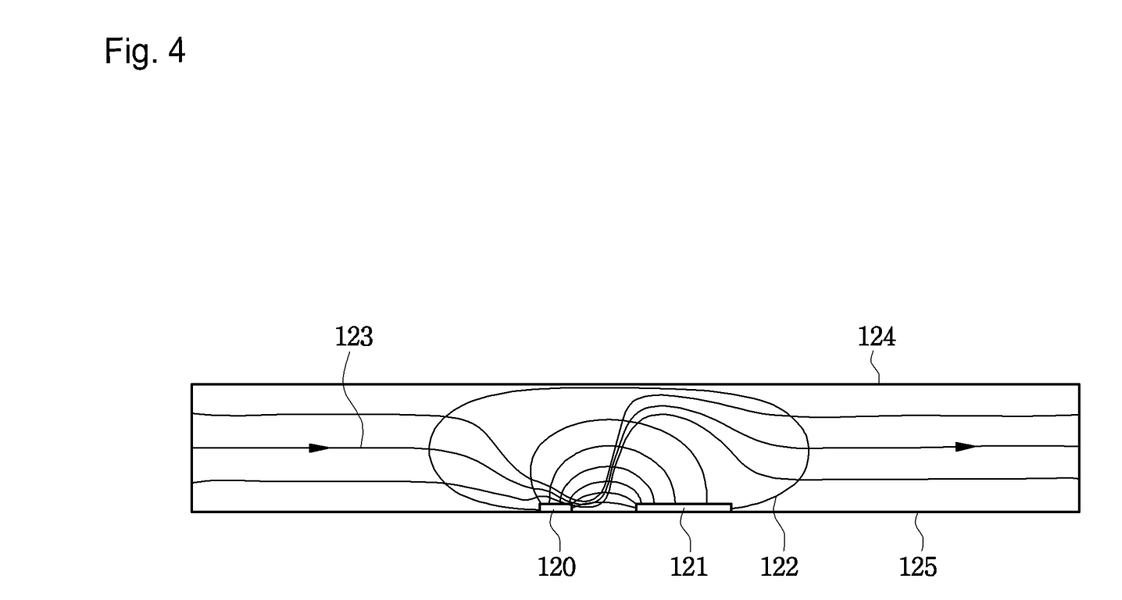
FIG. 4 is a diagram for describing a second principle of a planar electrode type insulation fluid micropump according to second to fourth embodiments of the present invention.

FIG. 4 is a diagram for describing a second principle of a planar electrode type insulation fluid micropump according to second to fourth embodiments of the present invention.

Referring to FIG. 4, the channels 124 and 125 include a first planar electrode 120 and a second planar electrode 121 on one side surface of the inside.

The channels 124 and 125 may use a rectangular shape or a cylinder shape.

The first planar electrode 120 includes a (−) pole or a (+) pole. A direct-current (DC) or alternating-current (AC) voltage is applied to the first planar electrode 120. The second planar electrode 121 includes an electrode with a wide width planar shape. A ground (GND) voltage is applied to the second planar electrode 121.

Hereinafter, an operation principle of the planar electrode type insulation fluid micropump according to the present invention will be described in brief.

When the insides of the channels 124 and 125 are filled with an insulation fluid and a direct-current (DC) or alternating-current (AC) voltage is subsequently applied to the first planar electrode 120, an irregular electrode field 122 is formed between the first planar electrode 120 and the second planar electrode 121.

In the formed irregular electric field 122, a gradient of electric conductivity of the insulation fluid is formed due to the Onsager effect. The formed gradient of the electric conductivity forms free charges in the insulation fluid due to the Maxwell-Wagner polarization phenomenon.

The formed free charges transfer a momentum to the peripheral insulation fluid while moving due to the influence of an electric force, so that the insulation fluid moves in one direction along an illustrated path 123. Thus, the planar electrode type insulation fluid micropump according to the present invention functions as a pump.

As the insulation fluid according to the present invention, a solution is used in which an ionic or non-ionic surfactant or an alcoholic additive is a little added to an organic or inorganic insulation fluid with very low electric conductivity in the range of $10^{-10}$ to $10^{-12}$ S/M. Preferably, an additive of 0.001 wt % to 10 wt % is contained.

In the present invention, metal substances with a property which is not solved in the insulation fluid are used for all of the first planar electrode 120 and the second planar electrode 121. An insulation substance such as glass, plastic, or rubber is used for the channels 124 and 125.

Figure 5:
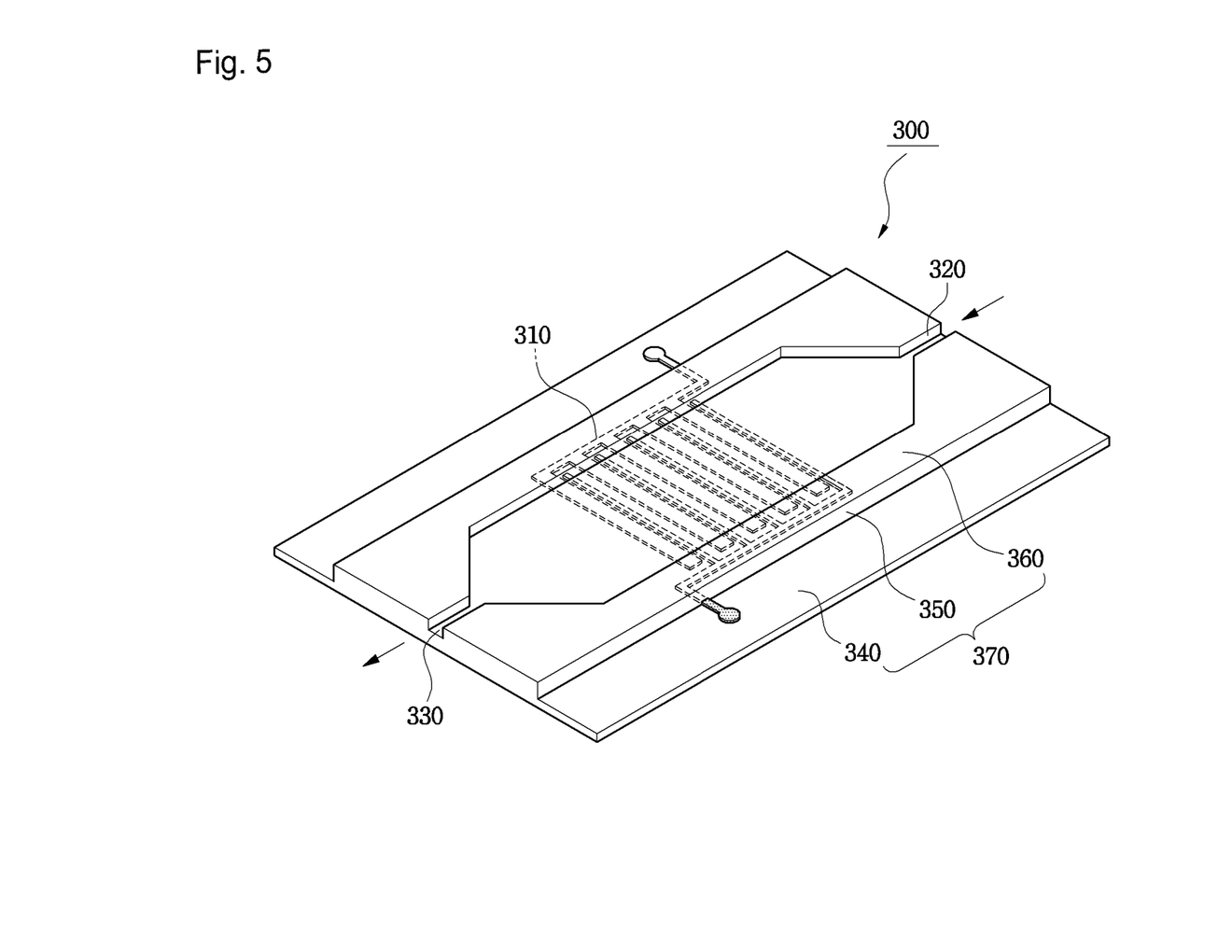
FIG. 5 is a plan view illustrating a planar electrode-rectangular channel type micropump according to the second embodiment of the present invention.
Figure 6:
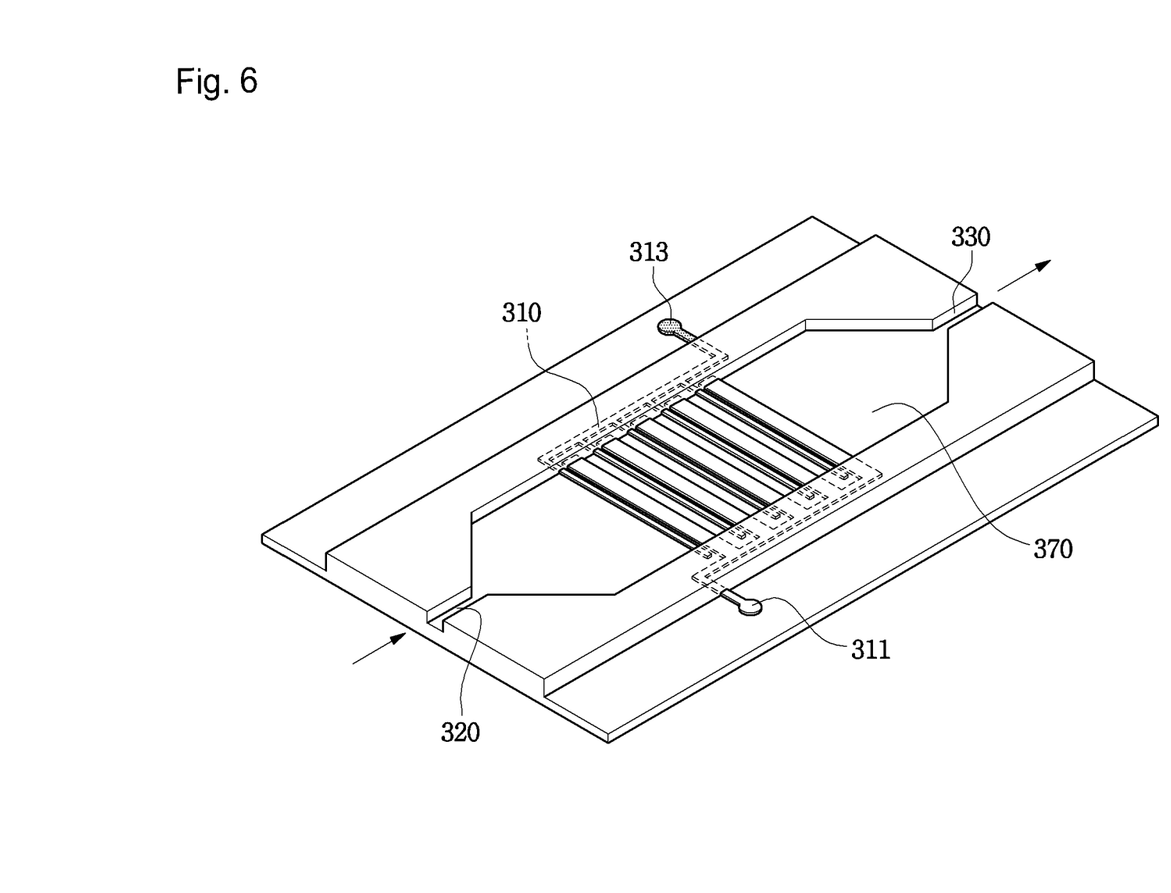
FIG. 6 is a plan view illustrating an inner arrangement of the planar electrode-rectangular channel type micropump according to the second embodiment of the present invention.
Figure 7:
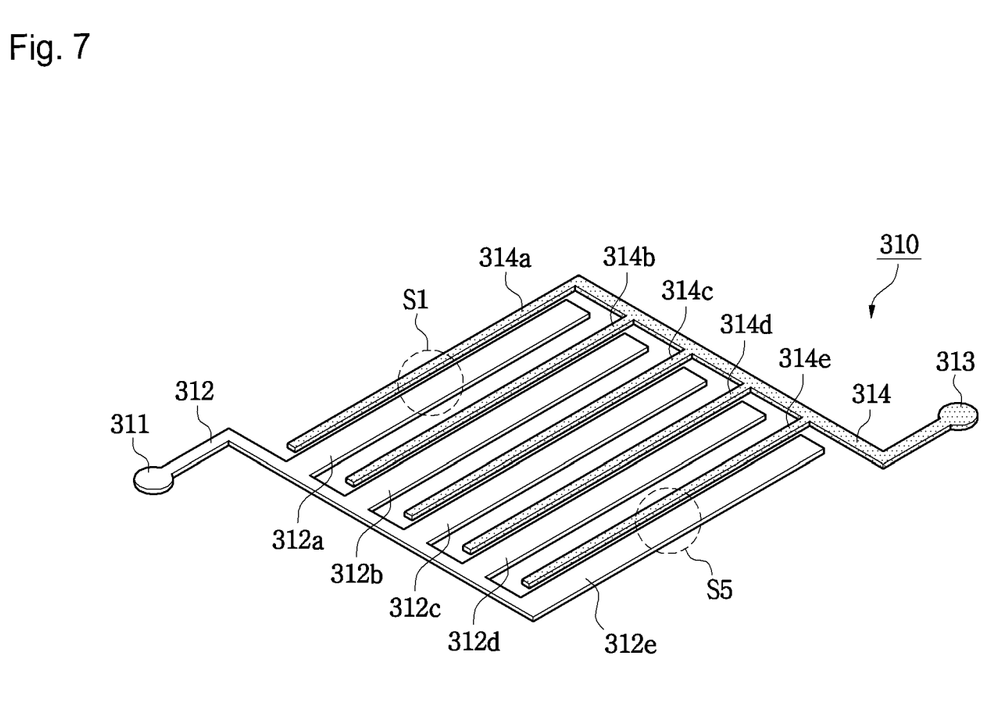
FIG. 7 is a plan view illustrating arrangement of inner electrodes of the planar electrode-rectangular channel type micropump according to the second embodiment of the present invention.

FIGS. 5, 6, 7 are a plan view illustrating a planar electrode-rectangular channel type micropump according to the second embodiment of the present invention, a plan view illustrating an inner arrangement of the planar electrode-rectangular channel type micropump, and a plan view illustrating arrangement of inner electrodes of the planar electrode-rectangular channel type micropump, respectively.

Referring to FIG. 5, a planar electrode-rectangular channel type micropump 300 according to the present invention is configured to include an electrode forming section 310, an inflow section 320, an outflow section 330, and a rectangular channel 370 including a channel bottom section 340, a vertical division wall 350, and an upper cover 360.

In the electrode forming section 310, the channel bottom section 340 is subjected to patterning with a metal substance. A channel in which the insulation fluid may move from the inflow section 320 to the outflow section 330 is formed by the vertical division wall 350. The upper portion of the vertical division wall 350 is sealed by the upper cover 360.

Hereinafter, the shape, disposition, and the like of the electrode forming section 310 will be described in detail with reference to FIG. 7.

The electrode forming section 310 is configured to include a ground electrode connecting portion 311, a second planar electrode upper joining portion 312, an external power supply connecting portion 313, and a first planar electrode upper joining portion 314.

The ground electrode connecting portion 311 is connected to the second planar electrode upper joining portion 312 and has a structure in which a ground voltage (GND) may be applied to the plurality of second planar electrodes 312a to 312e connected via the second planar electrode upper joining portion 312.

Likewise, the external power supply connecting portion 313 is connected to the first planar electrode upper joining portion 314 and has a structure in which a direct-current (DC) or alternating-current (AC) voltage supplied from an external power supply may be applied to a plurality of first planar electrodes 314a to 314e connected via the first planar electrode upper joining portion 314.

The first planar electrodes 314a to 314e have the same planar shape, width, and length. The second planar electrodes 312a to 312e also have the same planar shape, width, and length. The first planar electrodes 314a to 314e preferably have a width of 10 μm to 10 mm, a length of 50 μm to 100 mm. The second planar electrodes 312a to 312e have the same length of the first planar electrodes 314a to 314e, but the width of the second planar electrodes is 2 to 5 times of the width of the first planar electrodes.

The first planar electrode 314a and the second planar electrode 312a located at the first position constitute a first electrode set S1. Likewise, the first and second planar electrodes located at the second to fifth positions constitute a second electrode set S2 to a fifth electrode set S5, respectively.

In the case of the present invention, the five electrode sets have been described, but the present invention is not limited thereto. Of course, various modifications may be made in consideration of the fact that the movement rate of the insulation fluid is faster as the number of electrode sets increases.

Figure 8:
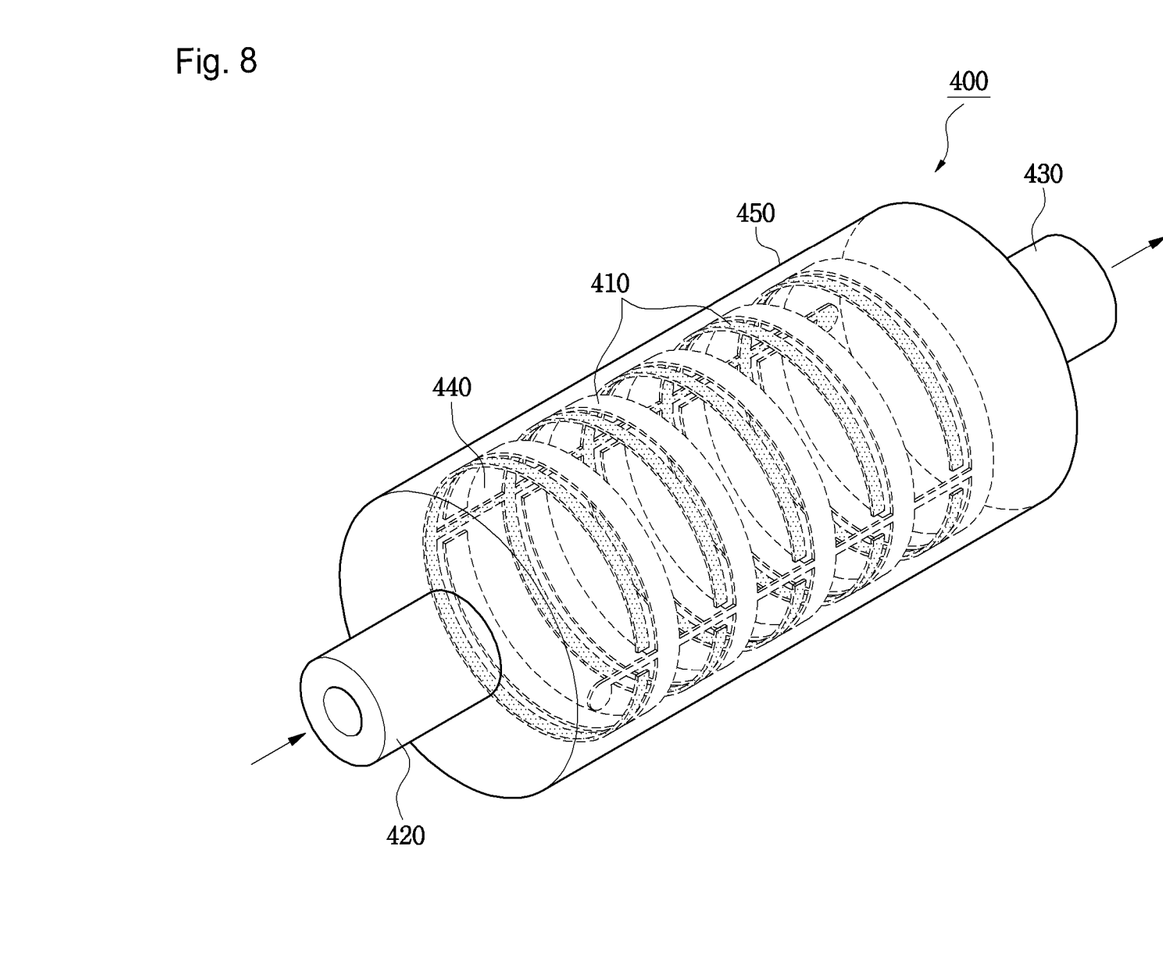
FIG. 8 is a perspective view illustrating a planar electrode-cylinder channel type micropump according to a third embodiment of the present invention.
Figure 9:
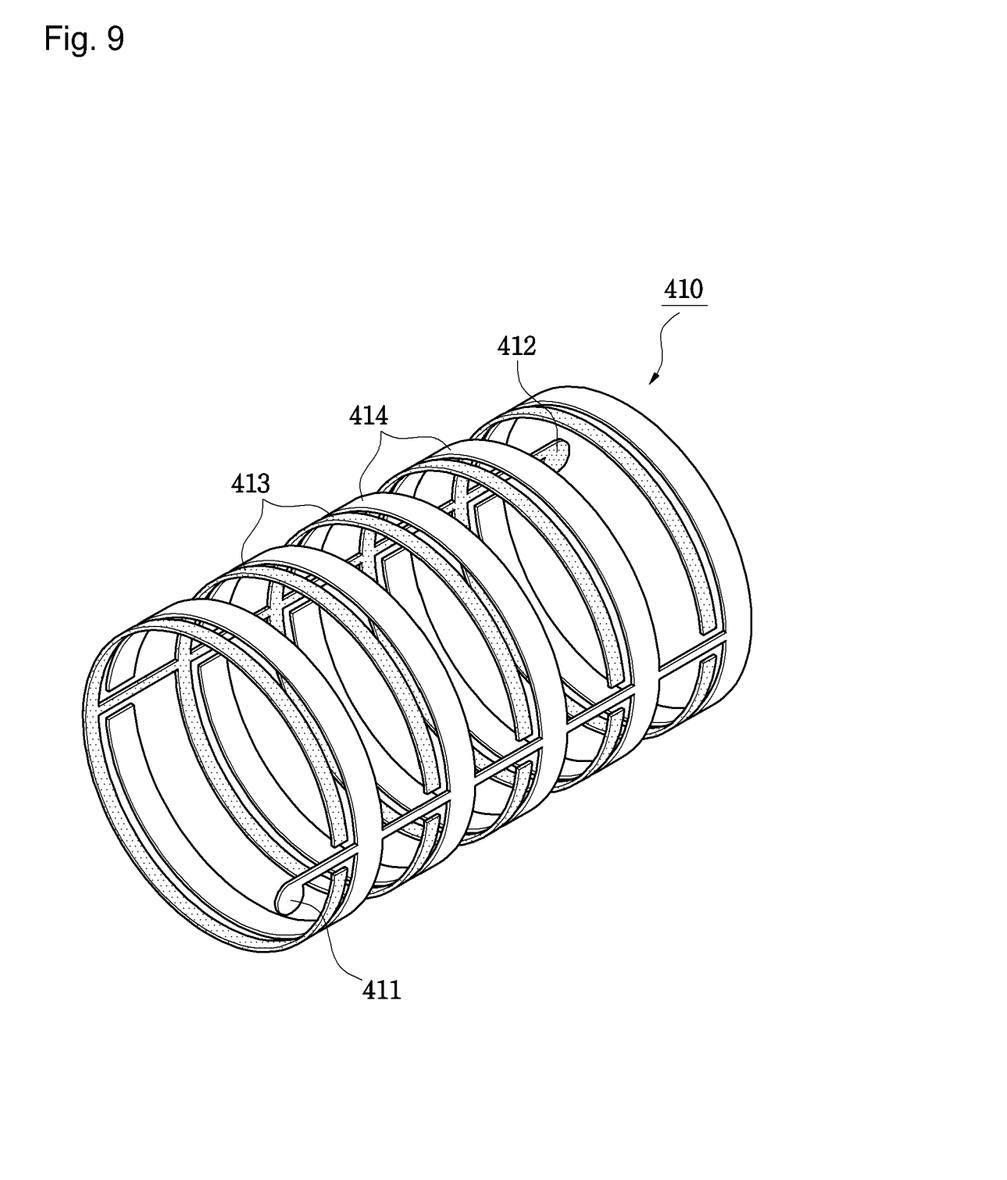
FIG. 9 is a perspective view illustrating arrangement of inner electrodes of the planar electrode-cylinder channel type micropump according to a third embodiment of the present invention.

FIGS. 8 and 9 are a perspective view illustrating a planar electrode-cylinder channel type micropump according to a third embodiment of the present invention and a perspective view illustrating arrangement of inner electrodes of the planar electrode-cylinder channel type micropump, respectively.

Referring to FIG. 8, a planar electrode-cylinder channel type micropump 400 according to the present invention is configured to include an electrode forming section 410, an inflow section 420, an outflow section 430, and a cylinder channel 440.

The electrode forming section 410 includes a ground electrode connecting portion 411, an external power supply connecting portion 412, a first planar electrode 413 having a cylindrical narrow planar surface, and a second planar electrode 414 having a cylindrical large planar surface.

On the other hand, an operation principle and a basic configuration of the planar electrode-cylinder channel type micropump 400 according to the third embodiment are basically the same as those of the planar electrode-rectangular channel type micropump 300 according to the second embodiment. There are differences in that the shape of the planar electrode is modified to the cylindrical shape and the rectangular shape depending on whether the shape of the channel is cylindrical or rectangular.

Accordingly, the repeated description of the details of the forgoing second embodiment will be omitted.

Figure 10:
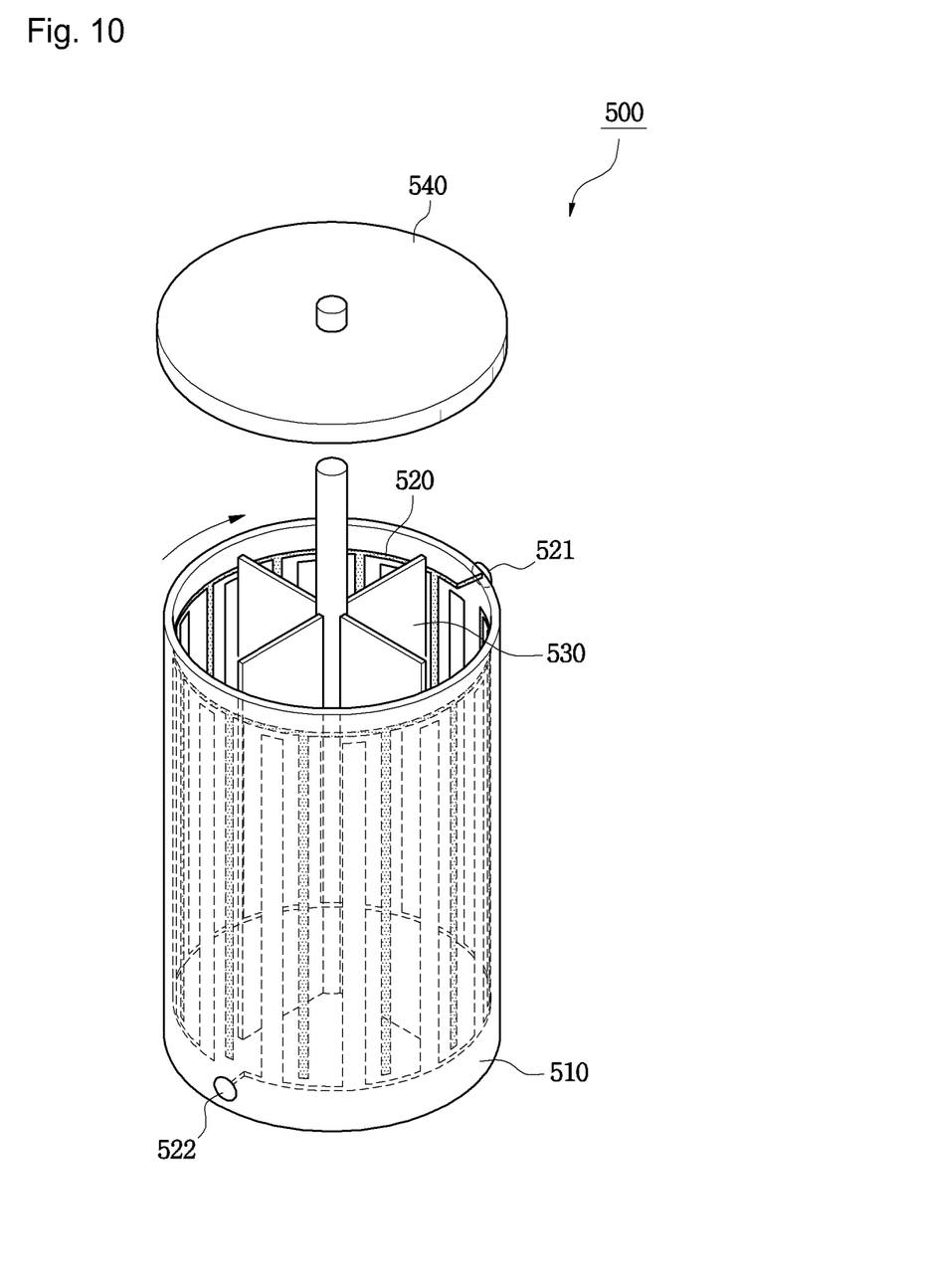
FIG. 10 is a perspective view illustrating a planar electrode-cylinder type electrohydraulic motor according to a fourth embodiment of the present invention.
Figure 11:
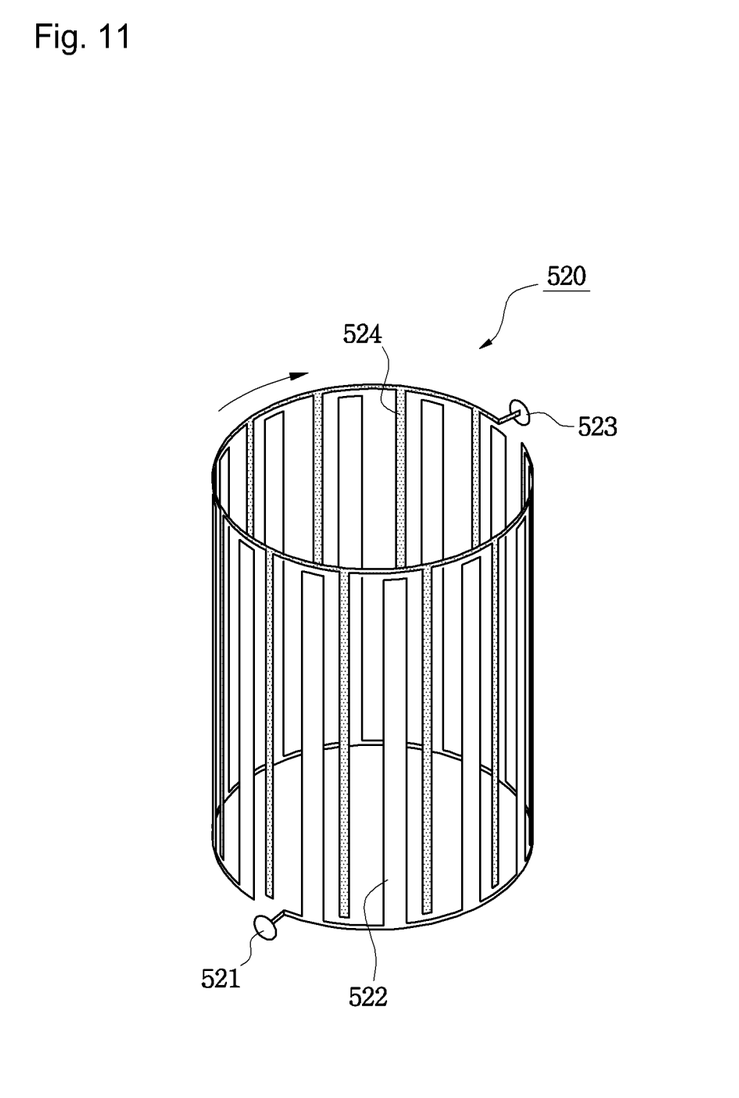
FIG. 11 is a perspective view illustrating arrangement of inner electrodes of the planar electrode-cylinder type electrohydraulic motor according to the fourth embodiment of the present invention.
Figure 12:
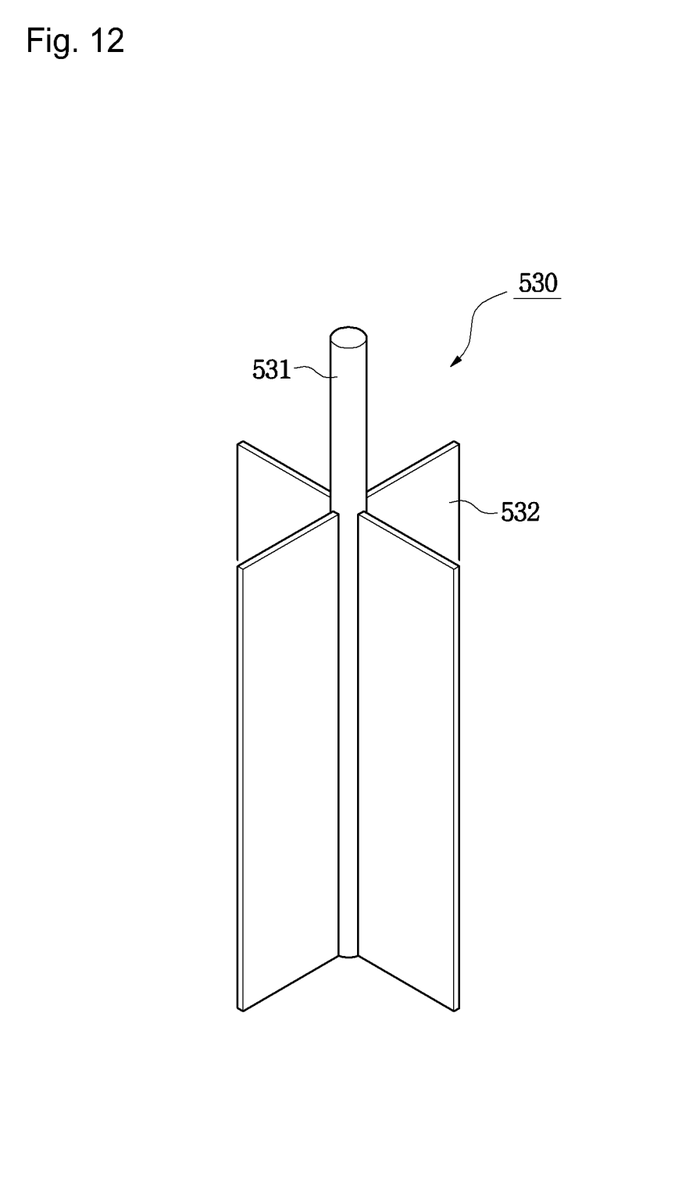
FIG. 12 is a perspective view illustrating an inner rotor of the planar electrode-cylinder type electrohydraulic motor according to the fourth embodiment of the present invention.

FIGS. 10, 11, and 12 are a perspective view illustrating a planar electrode-cylinder type electrohydraulic motor according to a fourth embodiment of the present invention, a perspective view illustrating arrangement of inner electrodes of the planar electrode-cylinder type electrohydraulic motor, and a perspective view illustrating an inner rotor of the planar electrode-cylinder type electrohydraulic motor, respectively.

Referring to FIG. 10, a planar electrode-cylinder type electrohydraulic motor 500 according to the present invention is configured to include a cylinder container 510, an electrode forming section 520, a rotor 530, and an upper cover 540.

The electrode forming section 520 is configured to include a ground electrode connecting portion 521, and an external power connecting portion 523 and include first planar electrodes 524 with a narrow width and second planar electrodes 522 with a large width for which a plurality of planar electrodes are patterned in the vertical direction on the wall surface of the cylinder container 510.

The electrode forming portion 520 of the fourth embodiment and the electrode forming portion 410 of the third embodiment are common in that the cylinder type channel has the planar electrode form, but differ in that the first and second planar electrodes of the electrode forming section are disposed in an intersection manner in a straight form in the vertical direction along the cylinder wall surface in the case of the fourth embodiment, but are arranged in an intersection manner in a circular form in the case of the third embodiment.

Due to this difference in the disposition of the electrodes, the insulation fluid is transported clockwise in the case of the fourth embodiment. In the case of the third embodiment, however, the insulation fluid is transported in a straight from in the direction from the inflow section 420 to the outflow section 430.

The rotor 530 is located inside the cylinder container 510 moves rotor's wirings 532 and provides a momentum to the rotor's wirings using a force which is generated at the time of application of an external electric field to the electrode forming section 520 and by which the insulation fluid is transported clockwise along the wall surface of the cylinder container 510. The rotor 530 dynamically works to the outside through a rotor shaft 531 connected to the dynamic body.

Accordingly, since a component configuration is simpler than the configuration of an electromagnetic motor of the related art, application to manufacturing of a small motor can be achieved.

Although the technical sprit of the present invention have been described for illustrative purposes with reference to the accompanying drawings, the preferred embodiments of the present invention are merely exemplified and do not limit the present invention. It should be apparent to those skilled in the art that various modifications, additions and substitutions are possible, without departing from the scope and the technical spirit of the present invention as disclosed in the accompanying claims.

What is claimed is:
1. A micropump configured to control flow of an insulation fluid, the micro pump comprising:

a rectangular channel (250) configured to have a rectangular shape in which a movement passage for the insulation fluid is formed;
an electrode forming section (210) configured to be formed inside the rectangular channel and include a plurality of electrodes, the plurality of electrodes having a cylinder shape for applying an electric field;
an inflow section (230) configured such that the insulation fluid flows in; and
an outflow section (240) configured such that the insulation fluid flows out,
wherein the movement passage is formed along a longitudinal direction of rectangular channel (250) between the inflow section (230) and the outflow section (240),
wherein the electrode forming section (210) includes:
a ground electrode connecting portion (211) configured for applying a ground voltage (GND);
an external power supply connecting portion (212) configured for applying a direct-current (DC) or alternating-current (AC) voltage supplied from an external power supply;
a first cylinder electrode upper joining portion (213) extended from the external power supply connecting portion (212) in the longitudinal direction; and
a second cylinder electrode upper joining portion (214) and a third cylinder electrode upper joining portion (215) extended from the ground electrode connecting portion (211) in the longitudinal direction,
wherein the plurality of electrodes are extended from the first cylinder electrode upper joining portion (213), the second cylinder electrode upper joining portion (214), and the third cylinder electrode upper joining portion (215) to have the cylinder shape, and
wherein the first cylinder electrode upper joining portion (213) is disposed between the second cylinder electrode upper joining portion (214) and the third cylinder electrode upper joining portion (215).

2. The micropump according to claim 1, wherein the first cylinder electrode upper joining portion (213),
the second cylinder electrode upper joining portion (214), and the third cylinder electrode upper joining portion (215) are disposed on a surface of the rectangular channel (250), and
wherein the plurality of electrodes extend from the first cylinder electrode upper joining portion (213), the second cylinder electrode upper joining portion (214) and the third cylinder electrode upper joining portion (215) in a direction perpendicular to the surface of the rectangular channel (250) towards an opposing surface of the rectangular channel (250).

3. The micropump according to claim 2, wherein the first cylinder electrode upper joining portion (213), the second cylinder electrode upper joining portion (214), and the third cylinder electrode upper joining portion (215) are configured to include at constant intervals a plurality of first cylinder electrodes (216a) to (216e) of the plurality of electrodes, a plurality of second cylinder electrodes (217a) to (217e) of the plurality of electrodes, and a plurality of third cylinder electrodes (218a) to (218e) of the plurality of electrodes, respectively.

4. The micropump according to claim 3, wherein the first cylinder electrodes (216a) to (216e), the second cylinder electrodes (217a) to (217e), and the third cylinder electrodes (218a) to (218e) are disposed in a non-collinear manner and an Nth (where N is a positive integer) electrode set is formed as a triangle with a vertex at an Nth position of the disposition of the cylinder electrodes.

5. The micropump according to claim 4, wherein the second cylinder electrodes (217a) to (217e), the first cylinder electrodes (216a) to (216e), and the third cylinder electrodes (218a) to (218e) each have a diameter of 50 μm to 10 mm.

6. The micropump according to claim 1, wherein the insulation fluid is a fluid in which an additive of 0.001 wt % to 10 wt % is used in an organic or inorganic solution with electric conductivity in a range of $10^{-10}$ to $10^{-12}$ S/m.

7. The micropump according to claim 6, wherein, as the additive, an ionic or non-ionic surfactant or an alcoholic substance is used.

8. The micropump according to claim 1, wherein an insulation substance is used as the rectangular channel (250) and a metal substance is used as the electrode forming section (210).

9. The micropump according to claim 1, wherein the second cylinder electrode upper joining portion (214) and the third cylinder electrode upper joining portion (215) are formed in a "U" shape.

* * * * *